United States Patent [19]

O'Malley et al.

[11] 4,379,893

[45] Apr. 12, 1983

[54] SURFACE-TREATED SOFT CONTACT LENSES

[75] Inventors: Mary A. O'Malley, Cleveland Heights; Nancy J. Drake, Painesville, both of Ohio

[73] Assignee: Diamond Shamrock Corporation, Dallas, Tex.

[21] Appl. No.: 296,379

[22] Filed: Aug. 26, 1981

[51] Int. Cl.³ .............................................. C08L 39/06
[52] U.S. Cl. .................................... 525/386; 523/106; 523/100; 351/160 H
[58] Field of Search ................ 525/386; 523/100, 106; 351/160 H

[56] References Cited

U.S. PATENT DOCUMENTS

| | | | |
|---|---|---|---|
| 3,772,235 | 11/1973 | Stamberger | 260/29.6 HN |
| 3,839,304 | 10/1974 | Hovey | 260/80.72 |
| 4,051,194 | 9/1977 | Ishikawa et al. | 260/836 |
| 4,097,657 | 6/1978 | Sieglaff et al. | 526/30 |
| 4,128,318 | 12/1978 | Sieglaff et al. | 351/160 R |

Primary Examiner—J. L. Schofer
Assistant Examiner—Bernard Lipman
Attorney, Agent, or Firm—Helen P. Brush

[57] ABSTRACT

A hydrophilic polymer shaped article adapted for use as a soft contact lens is treated to provide at least on the surfaces thereof a modified, less hydrophilic polymeric structure inhibiting penetration by proteins and other substances in the eye environment, whereby development of clouding and discoloration of the lens material during use is significantly retarded.

10 Claims, No Drawings

SURFACE-TREATED SOFT CONTACT LENSES

BACKGROUND OF THE INVENTION

1. Field of the Invention

This invention relates to hydrophilic plastic materials useful as soft contact lenses, and more particularly relates to treatment of said hydrophilic soft contact lenses to make them more resistant to clouding and discoloration in use.

2. The Prior Art

It has long been known to fabricate contact lenses from rigid, clear plastic materials, e.g., the essentially hydrophobic acrylic-type polymers as polymethyl methacrylate and the like. Although more safely handled and used than glass, such hydrophobic plastic materials have been only moderately successful as contact lenses, oftentimes being too hard and uncomfortable to the wearer with continued use. More recently, a different type of contact lens known as a soft lens has been developed from hydrophilic polymers. This lens is more easily accommodated by the eye and has become increasingly important in ophthalmological practice.

Hydrophilic soft contact lenses, in general, are fabricated from lightly cross-linked, essentially water-insoluble homopolymers, copolymers, terpolymers, etc., derived from one or more monomers containing hydroxyl groups which impart to these polymers their affinity for water. Hydrophilic polymers may further be defined as coherent, three-dimensional polymer structures or networks which have the ability to absorb or imbibe water, even in large quantities, e.g., up to 90 weight percent, without dissolution. When containing water in any amount whatsoever, a hydrophilic polymer will expand correspondingly to a hydrophilic polymer "gel." More specifically, a hydrophilic polymer containing imbibed water is known generally in the art as a "hydrogel." At the present time, the specific class of hydrated hydrophilic polymers, i.e., hydrogels which enjoy particular commercial acceptance as soft contact lenses, are broadly classed as the acrylic ester-type. In the main, acrylic ester hydrophilic polymers are derived by polymerizing a water-soluble monoester of acrylic or methacrylic acid in which the ester moiety contains at least one hydrophilic group in the presence of a minor amount, e.g., 5 percent or less by weight, of a bifunctional monomer, e.g., a diester of acrylic or methacrylic acid. The bifunctional material cross-links the hydrophilic group-containing monomer as it polymerizes. A specific acrylic ester hydrophilic polymer which has enjoyed significant commercial success as a soft contact lens is composed of polyhydroxylated alkyl, e.g., ethyl methacrylate (HEMA), cross-linked with the difunctional monomer ethylene glycol dimethacrylate.

Although contact lenses derived from hydrophilic polymers are much softer than the earlier hard contact lenses and can thus be accommodated by the wearer with much less discomfort, they nevertheless have disadvantageous properties and likewise have not been completely satisfactory. These lenses can be contaminated with pathological bacteria and fungi on their surfaces. If the lenses are not regularly cleaned and disinfected, or if stored in contaminated solutions, the pathogens can then be easily sorbed by the lens material due to its flexible, hydrophilic polymer structure. Corneal-damaging chemical residues from improper cleaning and/or disinfecting techniques can likewise be introduced into the lens material in this way. Proteins and other substances normally in the eye environment can be easily diffused into the lens with use, likewise because of its flexible, hydrophilic polymer structure. These substances cause discoloration and clouding of the lens with the repeated cleaning and disinfecting techniques practiced by the wearer. Further, the lenses oftentimes can lose sufficient amounts of water during use to deleteriously affect their dimensional stability and optical acuity.

It is an object of this invention to provide a soft contact lens wherein the diffusion of protein and other migratory eye substances is significantly inhibited so as to lengthen its life and optical effectiveness.

It is a further object of this invention to provide a soft contact lens which will retain a sufficient quantity of water during use to maintain its dimensional stability and optical acuity.

These and other objects of this invention will become apparent to those skilled in the art from the description of the invention which follows.

SUMMARY OF THE INVENTION

The present invention comprises treating a hydrophilic polymer shaped article to be used as a soft contact lens with an alkyl ester of an alkylene dicarboxylic acid conforming to the generic structure shown hereinafter, said treatment serving to chemically modify the polymeric structure comprising the lens. The desired modification of the polymer structure is effected, for example, through further cross-linking of the polymer molecules and/or by the attachment of less hydrophilic groups provided by the modifying compound onto the polymer chains. Treatment of the polymer lens is conducted for a sufficient period of time to effect structural modification of a portion of those polymer molecules on the outer surfaces of the lens so as to provide thereto a barrier against penetration by proteins and other substances in the eye environment. With improved resistance to protein diffusion, the treated lenses of this invention become significantly resistant to clouding and discoloration in use, and their service life is greatly extended. Thus, the process of this invention and the improved contact lenses produced thereby represent a substantial saving in replacement costs to the user.

DESCRIPTION OF THE PREFERRED EMBODIMENTS

As used herein in the specification and claims, the terms "hydrogel" and "polymer hydrogel" are each intended to refer to a shaped hydrophilic polymer, e.g., a hydrophilic polymer lens, which contains imbibed water in an amount ranging generally from less than one percent to 90 percent by weight of the shaped polymer. However, it is well recognized that to be completely comfortable to the eye, soft contact lenses for practical application normally contain at least about 30 percent water by weight.

The hydrophilic polymers which may be successfully treated in accordance with this invention are copolymers, terpolymers, etc., derived from a hydroxyalkyl methacrylate, e.g., hydroxyethyl methacrylate (HEMA), in combination with one or more of the following monomers: N-vinyl pyrrolidone, lower alkyl methacrylates, and vinyl esters of lower aliphatic acids, e.g., vinyl acetate or vinyl propionate, these polymeric materials containing minor quantities of difunctional monomers which serve as cross-linking agents to provide three-dimensional structure thereto. It is to be understood, however, that presently commercial soft contact lens materials reputed as homopolymers of HEMA or copolymers thereof with acrylamide cannot be successfully modified in accordance with this invention.

For purposes of convenience, the hydrophilic materials suitably treated in the process of this invention are designated hereinafter either as polymers or copolymers, whether they be copolymers, terpolymers, etc. In particular, those polymers which are copolymers of HEMA with N-vinyl pyrrolidone, and even more particularly, terpolymers of HEMA, N-vinyl pyrrolidone, and methylmethacrylate are the preferred hydrophilic polymers for use in this invention. Preparation of such terpolymers are described, for example, in U.S. Pat. No. 3,839,304, issued to Richard J. Hovey on Oct. 1, 1974. It should be noted that other water-insoluble, but water swellable polymers that are adapted for use in the present invention are those described in a series of U.S. patents to Paul Stamburger, beginning with U.S. Pat. No. 3,772,235, issued in November, 1973. It is to be understood, of course, that while there are many types of hydrophilic polymers adapted for the preparation of soft contact lenses which may be successfully treated herein, neither said hydrophilic polymers per se nor their preparation and/or fabrication into contact lenses constitute a part of this invention.

In accordance with the present invention, the hydrophilic copolymer lens is treated with a lower alkyl ester of an alkylene dicarboxylic acid of the general structure:

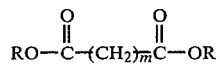

wherein R can be $CH_3$ or $C_2H_5$; and m is an integer of 1-6, inclusive. The specific esters of alkylene dicarboxylic acids conforming to the foregoing structural formula which are preferred are diethyl malonate, dimethyl succinate, diethyl succinate and diethyl suberate.

As described previously, the process of this invention comprises contacting a hydrophilic copolymer lens shape with any one of the aforesaid dicarboxylic acid esters for a sufficient period of time to effect a desired modification of at least the copolymer surfaces. To carry out the process, the lens material is immersed in the selected modifying ester at a temperature ranging generally from room temperature to about 100° C. for a time period ranging from about 1 hour to about 24 hours. It is to be understood, of course, that for any particular modifying treatment, the most satisfactory reaction time generally will be inversely proportional to the temperature, i.e., the time required to effect the desired degree of polymer modification typically will be shorter as the reaction temperature is increased. Particularly satisfactory results are obtained employing reaction temperatures of 40°-80° C. for 2-12 hours. Following the treatment, the lens material is removed and equilibrated in physiological saline for a time period ranging from 2-24 hours. As typically practiced herein, optimum results presently are obtained by conducting the modifying reaction initially at a temperature of 60°-70° C. for a time period of 2-10 hours, and then subsequently maintaining the soft contact lens material in physiological saline solution for at least 10 hours.

The proportion of modifying ester used to copolymer lens is not especially critical. All that is necessary is that sufficient modifying ester is used to cover the lenses. As the modifying esters are all liquids at room temperature, they are preferably employed in undiluted form. However, aqueous solutions which contain at least 50 percent by weight of the modifying ester may optionally be used.

The exact mechanism by which the alkylene dicarboxylic acid esters employed alter the molecular structure of the hydrophilic copolymer treated therewith is not known conclusively at this time. Modification, however, is believed to be effected by the attachment of one of the modifying ester's functional groups with an appropriate group, e.g., a hydroxyl, carbonyl, or vinyl group of the copolymer.

Upon completion of the modification reaction herein, the treated copolymer lens material is removed from the modifying compound, and rinsed well with water, physiological saline solution or the like. It is then equilibrated for several hours, e.g., 10-16 hours, in the saline solution (pH-7.4), afterwhich it is heated in fresh physiological saline solution for a time period of 20 minutes to 2 hours. Finally, the equilibrated copolymer typically is soaked in a suitable medium, e.g., simulated human tear solution (at physiological pH) or normal saline solution, until no more detectable modifying acid is leached therefrom. It can readily be understood that the aforesaid lens leaching process is necessary to remove therefrom any unreacted or residual modifying compound which may be irritating or damaging to the eye.

That the process of this invention does indeed modify the surface of the lens material is substantiated by the reduced uptake of labeled dye by the treated polymer materials, as shown hereinafter by specific example. The improved ability of the modified polymer to inhibit the diffusion of, e.g., proteins compared to untreated lens material likewise may be indicated by protein diffusion studies carried out by prolonged soaking of a treated lens in simulated human tear solution, saline, or other suitable media containing labeled enzymes and/or proteins.

By significantly inhibiting the transmission of opacifying and/or discoloring substances into soft contact lens materials, the process of this invention provides lens products which are greatly improved over many of those presently available. The modified lenses of this invention remain clear, transparent, and optically beneficial to the wearer for a longer period of time than has been possible with many of the presently used lenses, and accordingly, they need to be replaced much less often. Further, the modified lens products of this invention appear to retain water during use more efficiently than presently used lenses, thereby being resistant to shrinkage or other dimensional change and consistently providing optimum optical acuity, while providing a greater degree of comfort to the wearer.

For a fuller understanding of the nature and objects of this invention, the following specific examples are given. These examples are intended merely to illustrate the invention and are not to be construed in a limiting sense. All percentages, proportions and quantities given in these examples are by weight, unless otherwise indicated.

EXAMPLE 1

A soft contact lens in hydrated form, manufactured by American Optical under the Trade Name AO SOFT Lens, and reported to be composed primarily of 2-hydroxyethyl methacrylate, (HEMA) in combination with N-vinyl-2-pyrrolidone and methyl methacrylate, is placed in a 100-ml beaker. After adding 30 ml of diethyl succinate to the beaker, it is covered with a watch glass and then maintained at 75° C. in a water bath for 6 hours. The lens is then removed and equilibrated in physiological saline solution for approximately 12 hours. It is then placed in 10 ml of fresh saline solution, heated to 80° C. for 20 minutes and finally placed in fresh saline solution for a minimum of 2 hours. To insure that all residual, unbound diethyl succinate is leached from the modified lens, the procedure of heating the lens in physiological saline at 80° C., followed by storage in saline for 1-2 hours, may be repeated for 10 or more cycles.

EXAMPLES 2-4

Other hydrated contact lenses as used in Example 1 are treated with modifying agents set forth in the following table. in each instance, the lens is placed in the beaker, 30 ml of the particular ester is added, and the lens is maintained in contact therewith at the temperature and for the time period shown in the table.

TABLE 1

| Example | Modifying Ester | Treatment Temperature °C. | Treatment Time hrs. |
|---|---|---|---|
| 2 | Dimethyl Succinate | Room Temperature | 6 |
| 3 | Diethyl Suberate | 75 | 6 |
| 4 | Diethyl Malonate | 75 | 6 |

After treatment, each lens is removed, equilibrated and residual treating agent is leached therefrom as previously described.

EXAMPLE 5

Following the procedure as outlined in Example 1 above, a hydrated soft contact lens manufactured by Bausch and Lomb Inc. which is reported as a copolymer of HEMA and N-vinyl-2-pyrrolidone (NVP) is treated with diethyl succinate at 75° C. for 6 hours. After this time period, the lens is removed, equilibrated in physiological saline solution, and then stored in fresh saline solution as described in Example 1.

EXAMPLE 6

Following the procedure outlined in Example 1, a soft contact lens manufactured by Toyo Contact Lens Company under the Trade Name MENICON is treated with diethyl succinate also at 75° C. for 6 hours. This copolymer is reputed to be composed primarily of 2-hydroxyethyl methacrylate in combination with vinyl acetate, amyl methacrylate and vinyl propionate. After treatment, the modified lens is equilibrated and residual treating agent is removed therefrom as described in Example 1.

EXAMPLE 7

To illustrate that the structure of the lens polymer materials become permanently modified by the process of this invention, duplicate equilibrated AO SOFT Lens specimens from the preceding examples were placed in aqueous solutions of radioactive, i.e., labeled fluorescein dye for one minute. Upon removal from the labeled dye solution, each lens was rinsed in 5 ml of water. A second 5 ml water rinse followed. The lenses were placed in scintillation fluid and counted for labeled dye content. Untreated lenses were similarly subjected to fluorescein dye treatment as controls. Using this procedure, results are as follows:

TABLE 2

| Example | Modifier | DPMs* Retained |
|---|---|---|
| 1 | Diethyl Succinate | 3018 |
| 2 | Dimethyl Succinate | 3157 |
| 3 | Diethyl Suberate | 1659 |
| 4 | Diethyl Malonate | 2080 |
|  | Untreated Control | 3506 |

*Disintegrations per minute (average of duplicate specimens)

The above results indicate that the resistance of the soft contact lens samples to absorption of the labeled fluorescein dye therein is, by comparison to an untreated soft contact lens, substantially enhanced by treatment with the modifying compounds of this invention.

EXAMPLE 8

The treated soft contact lenses of Examples 5 and 6 above were contacted with aqueous solutions of labeled fluorescein dye as set forth in Example 7 above. Following the water rinses, the lenses were placed in scintillation fluid and counted for labeled dye content. Untreated lenses were similarly treated to serve as controls. Using this procedure, results are as follows:

TABLE 3

| Lenses | Modifying Compound | DPMs* Retained |
|---|---|---|
| Product of Example 5 | Diethyl Succinate | 3957 |
| Example 5 | None | 14895 |
| Product of Example 6 | Diethyl Succinate | 1808 |
| Example 6 | None | 3285 |

*As described previously

The above results show that soft contact lenses which are dissimilar in composition from the lens products of Example 1 are made significantly resistant to dye uptake by treatment with a modifying compound of this invention, by comparison to their untreated counterparts.

EXAMPLE 9

To further illustrate that a modifying compound becomes chemically bound in the contact lens material, an in vitro test for retardation of protein absorption and adsorption was carried out for 110 days. The diethyl succinate-treated lens products of Example 1 were placed daily in fresh concentrated simulated tear solution containing $^3$H-lysozyme. This solution contained the following ingredients for each 100 ml of aqueous solution:

0.00012% $^3$H-lysozyme
0.5999% lysozyme
0.04% Gamma-globulin
0.04% Beta-globulin
0.06% albumin
0.004% glucose
0.04% urea
0.90% sodium chloride After each daily storage period in the radioactive tear solution, the lenses were cleaned and heat disinfected, using physiological saline, in the manner normally performed daily by a contact lens wearer. The lenses were then placed in fresh tear solution. Lens samples were sacrificed at various time intervals and counted for $^3$H-lysozyme gain. Untreated lenses of the like composition were similarly stored, cleaned and counted as controls. Using this procedure, the following results were obtained:

TABLE 4

| No. of Days in Tear Solution | Average ³H-Lysozyme in Lens Sample (dpm) | |
| --- | --- | --- |
| | Untreated | Treated |
| 14 | 327 | 318 |
| 28 | 528 | 283 |
| 42 | 392 | 277 |
| 56 | 581 | 333 |
| 91 | 699 | 350 |
| 110 | 922 | 653 |

The data show significantly lower disintegrations per minute (dpm) in the treated lenses starting at about day 28. This fact indicates less protein (lysozyme) absorption/adsorption into the treated lenses, and that the diethyl succinate treatment is effective in inhibiting protein uptake by the lens.

EXAMPLE 10

This example illustrates that commercial soft contact lens materials reputed as homopolymers of HEMA or copolymers thereof with acrylamide cannot be successfully modified according to this invention.

Following the procedure outlined in Example 1, hydrated HEMA homopolymer soft contact lenses and hydrated HEMA-acrylamide copolymer soft contact lenses were placed in diethyl succinate, then maintained at 75° C. for 6 hours. The lenses were removed and equilibrated in physiological saline solution for 10-12 hours. They were then placed in fresh saline solution and heated to 80° C. for 20 minutes and finally placed in fresh saline solution for at least 2 hours.

Duplicate equilibrated lens samples were placed in aqueous solutions of labeled fluorescein dye as described in Example 7. As controls, duplicate untreated lens samples were similarly contacted with labeled dye solution. After being rinsed, both the treated and untreated lenses were placed in scintillation fluid and counted for labeled dye content. The averaged results are as follows:

TABLE 5

| Lens Sample | Treated | DPMs Retained |
| --- | --- | --- |
| HEMA Homopolymer | Yes | 3109 |
| | No | 2975 |
| HEMA Acrylamide Copolymer | Yes | 1956 |
| | No | 1431 |

In each instance, the untreated control lenses retained less labeled dye than their treated counterparts. Accordingly, the process of this invention is not suitable for modifying the tested HEMA homopolymer and copolymer so as to retard clouding and/or discoloration thereof.

We claim:

1. A process for producing a soft contact lens resistant to the diffusion and accumulation therein of substances which promote its clouding and discoloration in use, which process comprises employing a hydrophilic polymer lens shape which is selected from the group consisting of hydroxyethyl methacrylate-N-vinyl pyrrolidone copolymers, hydroxyethyl methacrylate-N-vinyl pyrrolidone-methyl methacrylate terpolymers, and polymerized mixtures of hydroxyethyl methacrylate, amyl methacrylate, vinyl acetate and vinyl propionate, and treating said hydrophilic polymer lens shape with a modifying compound which is a lower alkyl ester of an alkylene dicarboxylic acid having the structural formula:

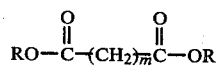

wherein R can be $CH_3$ or $C_2H_5$; and m is an integer of 1-6, inclusive, the treatment being conducted for a sufficient period of time to structurally modify a portion of polymer molecules in the outer surfaces of said hydrophilic polymer lens shape by incorporating therein the modifying compound through its functional groups.

2. The process of claim 1 wherein the modifying compound is dimethyl succinate.

3. The process of claim 1 wherein the modifying compound is diethyl succinate.

4. The process of claim 1 wherein the modifying compound is diethyl malonate.

5. The process of claim 1 wherein the modifying compound is diethyl suberate.

6. The process of claim 1 wherein the hydrophilic polymer lens shape has been at least partially hydrated prior to treatment.

7. The process of claim 1 which is conducted at a temperature ranging from room temperature to 100° C. for a time period ranging from 1 hour to about 24 hours.

8. The process of claim 1 which is conducted at a temperature of 40°-80° C. for a time period of 2-12 hours.

9. The process of claim 1 in which the treated lens is subsequently maintained in saline solution for a time period of at least 10 hours.

10. A soft contact lens prepared according to the process of claim 1 which is resistant to the diffusion and accumulation therein of substances causing its clouding and discoloration in use.

* * * * *